(12) United States Patent
Safian

(10) Patent No.: US 6,238,201 B1
(45) Date of Patent: May 29, 2001

(54) MULTILAYER CONTAINER PACKAGE MOLDING APPARATUS

(75) Inventor: John W. Safian, Maumee, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/561,326

(22) Filed: Apr. 28, 2000

Related U.S. Application Data

(62) Division of application No. 09/197,732, filed on Nov. 20, 1998, now Pat. No. 6,083,450, which is a division of application No. 08/807,944, filed on Feb. 28, 1997, now abandoned.

(51) Int. Cl.[7] .................................................... B29C 49/22
(52) U.S. Cl. .......................................... 425/527; 425/535
(58) Field of Search ................................ 425/527, 531, 425/535

(56) References Cited

U.S. PATENT DOCUMENTS

| H469 | 5/1988 | Deak . |
| Re. 33,969 | 6/1992 | Richter . |

(List continued on next page.)

FOREIGN PATENT DOCUMENTS

| 0182094 | 10/1985 | (EP) . |
| 0596142 | 11/1993 | (EP) . |
| 1329257 | 9/1973 | (GB) . |
| 1455453 | 11/1976 | (GB) . |
| 141778 | 4/1952 | (JP) . |
| 47-35548 | 9/1972 | (JP) . |
| 2-72528 | 11/1988 | (JP) . |
| 1-176066 | 12/1989 | (JP) . |
| 2-8764 | 1/1990 | (JP) . |
| 3-133748 | 6/1991 | (JP) . |
| 68009 | 10/1940 | (RU) . |
| 8600868 | 2/1986 | (WO) . |
| 9114630 | 10/1991 | (WO) . |
| 9302926 | 2/1993 | (WO) . |
| 9323311 | 11/1993 | (WO) . |

Primary Examiner—Robert Davis

(57) ABSTRACT

A multilayer container including an outer relatively rigid plastic layer having a body portion, a finish defining an opening and a base having an atmospheric vent opening therethrough. The container includes an inner flexible plastic layer of relative thin flexible material throughout which does not adhere to the outer plastic layer. The inner flexible layer has a closed bottom portion engaging the inner surface of the finish of the outer plastic layer and a radially extending flange portion of the inner layer overlying the finish of the outer layer. The outer layer preferably comprises an olefin and the inner layer preferably comprises amorphous nylon. The method of making the multilayer container includes coextruding a parison comprising the relatively thick outer layer of plastic material and the relatively thin inner layer of plastic material, closing molds about the parison, blow molding the parison to form the outer rigid plastic layer having a body portion, the finish defining an opening, and the base and the inner flexible layer of relatively thin flexible material.

2 Claims, 8 Drawing Sheets

U.S. PATENT DOCUMENTS

| | | |
|---|---|---|
| 798,093 | 9/1905 | Dean . |
| 1,035,718 | 8/1912 | Marsters et al. . |
| 1,632,559 | 6/1927 | Pedrick . |
| 2,433,945 | 1/1948 | Foreman . |
| 2,571,424 | 10/1951 | Dailey . |
| 2,678,764 | 5/1954 | Carlson . |
| 2,715,980 | 8/1955 | Frick . |
| 2,866,569 | 12/1958 | Morrison . |
| 2,891,700 | 6/1959 | Maynard . |
| 2,924,359 | 2/1960 | Beremand . |
| 3,023,461 | 3/1962 | Sherman . |
| 3,039,648 | 6/1962 | Busch . |
| 3,097,766 | 7/1963 | Biehl et al. . |
| 3,171,571 | 3/1965 | Daniels . |
| 3,198,392 | 8/1965 | Wilson et al. . |
| 3,257,036 | 6/1966 | Micallef . |
| 3,258,147 | 6/1966 | Rownd . |
| 3,260,412 | 7/1966 | Larkin . |
| 3,263,009 | 7/1966 | Vidal . |
| 3,355,069 | 11/1967 | Miles . |
| 3,409,714 | 11/1968 | Strugar . |
| 3,508,587 | 4/1970 | Mauch . |
| 3,651,186 | 3/1972 | Hall . |
| 3,733,013 | 5/1973 | Doyle . |
| 3,752,351 | 8/1973 | Nagata . |
| 3,767,747 | 10/1973 | Uhlig . |
| 3,773,233 | 11/1973 | Souza . |
| 3,781,395 | 12/1973 | Uhlig . |
| 3,836,335 | 9/1974 | Eppes . |
| 3,896,602 | 7/1975 | Petterson . |
| 3,923,943 | 12/1975 | Iriko et al. . |
| 3,978,184 | 8/1976 | Dybala et al. . |
| 4,034,896 | 7/1977 | Wilson . |
| 4,147,278 | 4/1979 | Uhlig . |
| 4,154,345 | 5/1979 | Davis et al. . |
| 4,173,447 | 11/1979 | Bradbury . |
| 4,174,783 | 11/1979 | Abe et al. . |
| 4,182,457 | 1/1980 | Yamada et al. . |
| 4,254,075 | 3/1981 | Menzel et al. . |
| 4,322,020 | 3/1982 | Stone . |
| 4,330,066 | 5/1982 | Berliner . |
| 4,418,841 | 12/1983 | Eckstein . |
| 4,457,455 | 7/1984 | Meshberg . |
| 4,484,697 | 11/1984 | Fry, Jr. . |
| 4,497,622 | 2/1985 | Grebowiec . |
| 4,526,823 | 7/1985 | Farrell et al. . |
| 4,550,009 | 10/1985 | Burkel . |
| 4,558,792 | 12/1985 | Cabernoch et al. . |
| 4,609,516 | 9/1986 | Krishnakumar et al. . |
| 4,657,151 | 4/1987 | Cabernoch . |
| 4,693,395 | 9/1987 | Tavss et al. . |
| 4,693,396 | 9/1987 | Tavss et al. . |
| 4,719,069 | 1/1988 | Reymann et al. . |
| 4,741,936 | 5/1988 | Nohara et al. . |
| 4,753,591 | 6/1988 | Maes et al. . |
| 4,775,879 | 10/1988 | Robb et al. . |
| 4,781,954 | 11/1988 | Krishakumar et al. . |
| 4,816,093 | 3/1989 | Robbins, II . |
| 4,821,896 | 4/1989 | Cheng . |
| 4,875,508 | 10/1989 | Burke, II et al. . |
| 4,892,230 | 1/1990 | Lynn, Jr. . |
| 4,893,731 | 1/1990 | Richter . |
| 4,937,130 | 6/1990 | Clagett et al. . |
| 4,951,841 | 8/1990 | Tavss et al. . |
| 4,953,750 | 9/1990 | Abernathy . |
| 4,954,376 | 9/1990 | Krishnakumar et al. . |
| 4,966,543 | 10/1990 | Krishnakumar et al. . |
| 4,979,631 | 12/1990 | Krishnakumar et al. . |
| 4,980,100 | 12/1990 | Krishnakumar et al. . |
| 4,982,872 | 1/1991 | Avery . |
| 4,984,713 | 1/1991 | Chambers et al. . |
| 4,990,301 | 2/1991 | Krishnakumar et al. . |
| 5,012,956 | 5/1991 | Stoody . |
| 5,020,691 | 6/1991 | Nye . |
| 5,021,209 | 6/1991 | Dickinson . |
| 5,032,341 | 7/1991 | Krishnakumar et al. . |
| 5,035,931 | 7/1991 | Yamada et al. . |
| 5,049,345 | 9/1991 | Collette et al. . |
| 5,078,948 | 1/1992 | Troutman et al. . |
| 5,104,607 | 4/1992 | Driska . |
| 5,108,805 | 4/1992 | Gerard . |
| 5,125,526 | 6/1992 | Sumanis . |
| 5,129,735 | 7/1992 | Neal et al. . |
| 5,137,179 | 8/1992 | Stoffel . |
| 5,141,695 | 8/1992 | Nakamura . |
| 5,145,107 | 9/1992 | Silver et al. . |
| 5,147,071 | 9/1992 | Rutter et al. . |
| 5,152,427 | 10/1992 | Pope et al. . |
| 5,156,300 | 10/1992 | Spahni et al. . |
| 5,163,485 | 11/1992 | Hermann . |
| 5,170,911 | 12/1992 | Della Riva . |
| 5,242,085 | 9/1993 | Richter et al. . |
| 5,242,086 | 9/1993 | Richter et al. . |
| 5,301,838 | 4/1994 | Schmidt et al. . |
| 5,301,840 | 4/1994 | Sun . |
| 5,305,921 | 4/1994 | Kock et al. . |
| 5,344,045 | 9/1994 | Richter . |
| 5,353,930 | 10/1994 | Berry, Jr. . |
| 5,383,576 | 1/1995 | Richter et al. . |
| 5,385,269 | 1/1995 | Richter et al. . |
| 5,407,629 | 4/1995 | Schmidt et al. . |
| 5,429,702 | 7/1995 | Grooms et al. . |
| 5,433,347 | 7/1995 | Richter et al. . |
| 5,435,452 | 7/1995 | Nishigami et al. . |
| 5,443,766 | 8/1995 | Slat et al. . |
| 5,445,783 | 8/1995 | Irish et al. . |
| 5,497,911 | 3/1996 | Ellion et al. . |
| 5,513,761 | 5/1996 | Kobayashi et al. . |

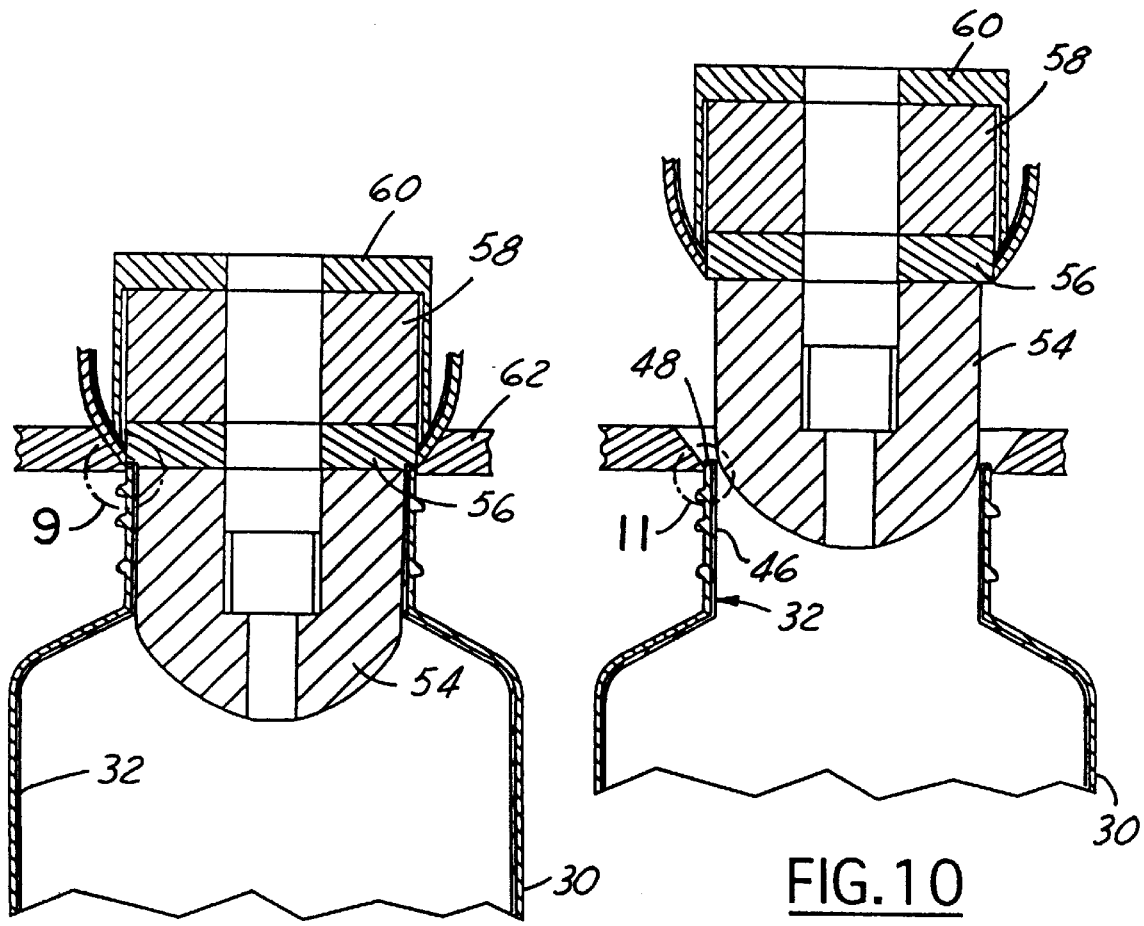
FIG. 8
FIG. 10
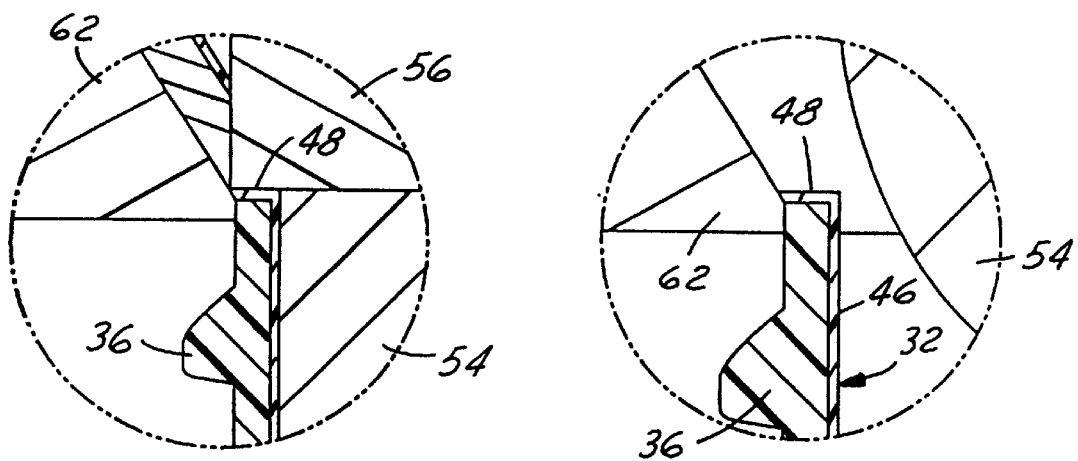
FIG. 9
FIG. 11

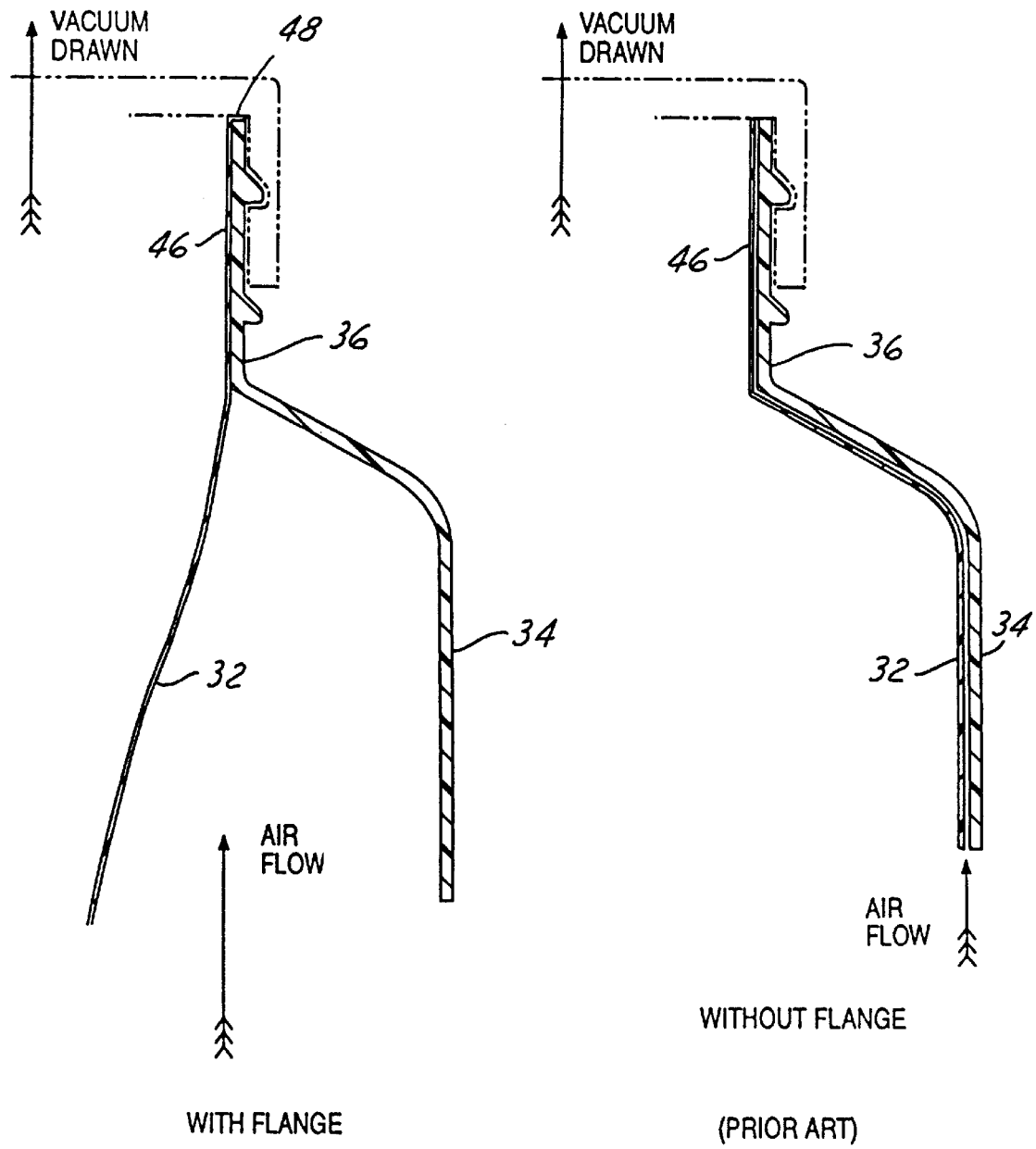

MULTILAYER CONTAINER PACKAGE MOLDING APPARATUS

This application is a division of application Ser. No. 09/197,732 filed Nov. 20, 1998 and now U.S. Pat. No. 6,083,450, which is a division of application Ser. No. 08/807,944 filed Feb. 28, 1997 now abandoned.

This invention relates to multilayer containers and particularly to multilayer container packages that comprise an outer relatively rigid plastic container and an inner relatively thin plastic container.

BACKGROUND AND SUMMARY OF THE INVENTION

One type of container which is well known comprises an outer relatively rigid plastic layer and an inner relatively flexible inner layer. The outer layer is provided with an atmospheric vent opening such that the inner flexible layer collapses arid delaminates from the outer layer when the liquid contents are dispensed. In the manufacture of such containers, it is common to apply a differential pressure to insure that the delamination will occur. In addition, it is usually necessary to trim the containers. Typical containers are shown, for example, in U.S. Pat. Nos. 5,435,452 and 5,513,761. Such containers are used with dispensers such as pump dispensers or spray dispensers and the inner layer, sometimes called a bag, is made of a resin which is compatible with the liquid contents.

Among the objectives of the invention are to provide a multilayer container wherein the container does not require trimming and the like; wherein the atmospheric vent opening is obtained during the blow molding of the package; wherein any tendency of the inner layer to adhere to the outer layer is eliminated; and wherein no delamination step is required in the manufacture.

In accordance with the invention, the multilayer container comprises an outer relatively rigid plastic layer having a body portion, a finish defining an opening and a base. The outer rigid layer has an atmospheric vent opening therethrough. The container includes an inner flexible plastic layer of relative thin flexible material throughout which does not adhere to the outer plastic layer. The inner flexible layer has a closed bottom portion engaging the inner surface of the finish of the outer plastic layer and a radially extending flange portion of the inner layer overlying the finish of the outer layer. The outer layer preferably comprises an olefin and the inner layer preferably comprises amorphous nylon. The method of making the multilayer container includes coextruding a parison comprising a relatively thick outer layer of plastic material and a relatively thin inner layer of plastic material, the outer plastic material and inner plastic material being such that the layers will not adhere to one another, closing molds about the parison, blow molding the parison to form an outer rigid plastic layer having a body portion, a finish defining an opening, and a base and an inner flexible layer of relatively thin flexible material throughout which does not adhere to the outer plastic layer and the inner flexible layer having a portion engaging the inner surface of the finish of the outer plastic layer and a radially extending flange portion of the inner layer overlying the finish, and simultaneously forming an atmospheric vent opening to the outer layer. During the blow molding, the base of the outer layer is formed with an outer generally planar surface and a diametral slit. A portion of the inner layer extends along the inner surface of the base of the outer layer and a portion of the inner layer extends into the opening but not beyond the outer surface of the base. When the contents are dispensed by a differential pressure, air enters through the vent opening and the inner layer readily delaminates from the outer layer without the need of any prelamination step in the making of the container.

DESCRIPTION OF THE DRAWINGS

FIG. 8 is a sectional view showing the apparatus of FIG. 7 in a further operative position.

FIG. 9 is an enlarged view taken at the circle 9 in FIG. 8.

FIG. 10 is a sectional view showing the apparatus of FIG. 8 in a further operative position.

FIG. 11 is an enlarged view taken at the circle 11 in FIG. 10.

FIG. 12 is a partly diagrammatic view showing the movement of the inner layer relative to the outer layer during dispensing of the contents.

FIG. 13 is a similar view of a prior art container.

DETAILED DESCRIPTION OF THE PREFERRED EMBODIMENTS

Figure 2:
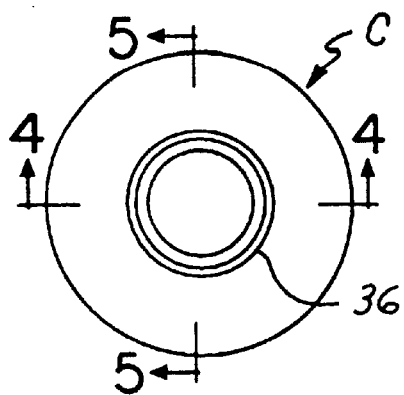
FIG. 2 is a top plan view.
Figure 5A:
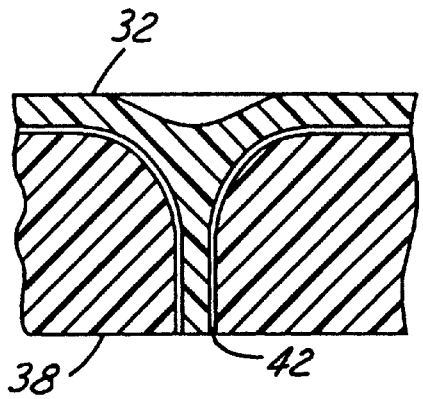
FIG. 5A is a sectional view on a greatly enlarged scale taken at the circle 5A in FIG. 5.
Figure 1:
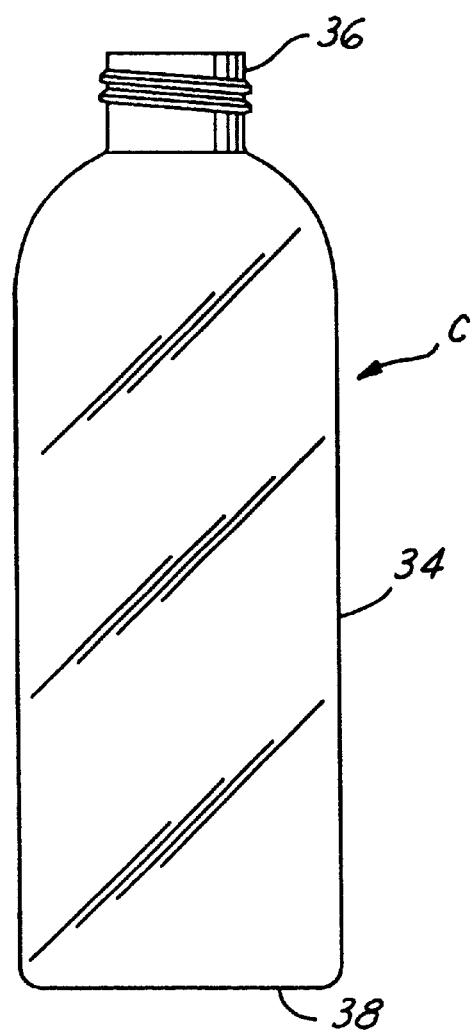
FIG. 1 is an elevational view of the multilayer container embodying the invention.

Referring to FIGS. 1–5A, the container C embodying the invention comprises an outer relatively rigid plastic layer 30 and an inner relatively thin inner layer 32. The outer layer 30 includes a body portion 34, a finish 36 and a base 38 having a diametral slit 40 defining an atmospheric vent opening 42. The inner layer 32 comprises a body portion 44, a finish portion 46 extending along the inside surface of the finish 36 of the outer layer and having a radial flange 48 overlying the radial surface of the finish 36. The bottom 50 of the inner layer is closed.

The container is made by coextruding a parison, closing molds about the parison and blow molding the parison. A preferred apparatus is shown in U.S. Pat. Nos. 3,781,395, 3,767,747 and 3,978,184, incorporated herein by reference.

In accordance with the invention, a blowpin assembly 52 is provided which applies air to blow the layers and shape the flange 48 and sever the moil. The blowpin assembly is composed of a blowpin tip 54, a cutter 56, a spacer 58 and a sleeve 60. These components are assembled together and attached onto a blowpin station stem. Expansion air is blown through the assembly to blow the container. The blowpin tip 54 is sized so that specific container finish and neck dimensions are achieved. The cutter 56 is sized to be about 0.010 inches larger in diameter than the diameter of anvil 62 so that it can fold and flatten the inner layer over the outer layer. In addition, it pinches the extra parison portion or moil between the anvil and the cutter 56. This cutting is the result of the downward motion of the blowpin assembly cutter 56 against the anvil. The sleeve 60 is larger in diameter than the bottom of the opening in the anvil 62, for example, approximately 0.030 inch, and is used as an air deflector which both cools the severed moil and acts as a carrier which removes the moil as the blowpin assembly 52 moves upward and away from the finished container. The spacer 58 establishes the position of the blowpin tip 54 and cutter 56 at the proper depth in relation to the mold and sleeve away from the anvil surface. It also has through-holes drilled therein such that air can be channeled to the sleeve.

Figure 6:
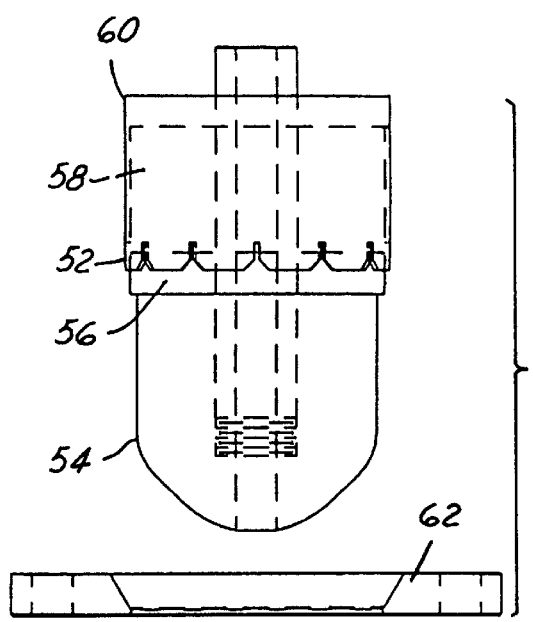
FIG. 6 is a partly diagrammatic vertical sectional view of the apparatus far forming the finish of the container.
Figure 5:
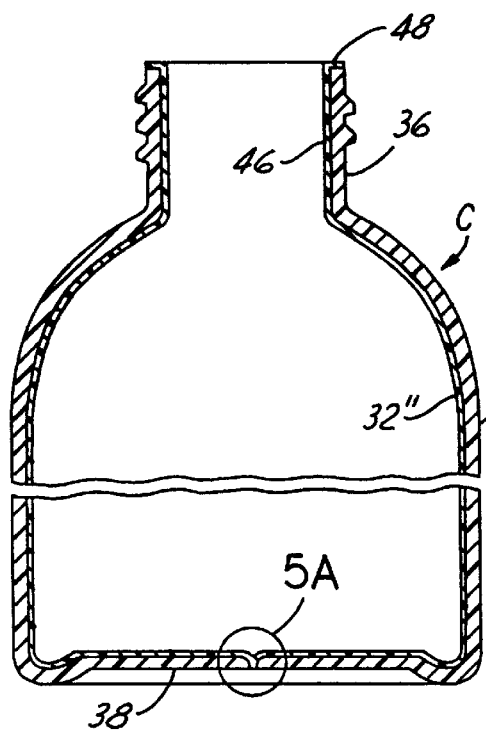
FIG. 5 is a sectional view on an enlarged scale taken along the line 5—5 in FIG. 2.

In the blow molding cycle, the open molds are transferred from a resting position to an up and under position relative to the free-flowing parison. At the correct time, the molds are closed and the parison is cut. The closed mold is transferred to a At down and resting position where the blowpin station is positioned over the mold. The machine control then moves the blowpin assembly 52 downward towards the mold and enters the mold through the anvil 62. FIG. 6 shows this entry point of the blowpin assembly, position and shape of the top portion of the hot parison. The top portion of the cut parison and above the bottom of the anvil is called the moil. It is cone-like in shape and lays around the upper portion of the anvil 62.

Figure 7:
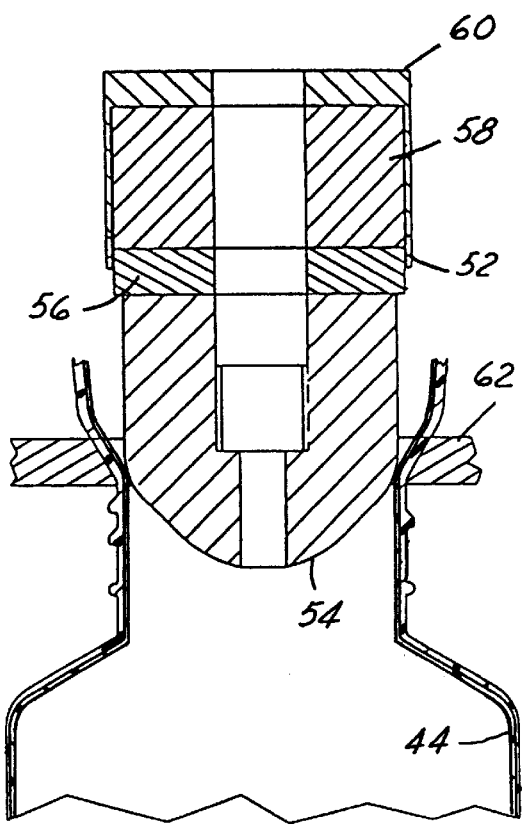
FIG. 7 is a sectional view showing the apparatus of FIG. 6 in a different operative position.

Referring to FIGS. 7 and 8, the blowpin assembly 52 is shown down and bottomed against the anvil 62 and mold. Since the blowpin 54 entered the inner layer of the multilayer container, the cutter 56 first comes in contact with the parison. It will tend to push outward, flatten and then compress the inner layer against the outer layer as in FIG. 9. When the blowpin assembly 52 reaches its final downward travel, the sharp cutter edge 56 will pinch and cut both layers against the sidewall of the anvil 62. During this time, expansion air is flowing thru the spacer 58, sleeve 60 and the severed parison so that the moil M will form around the sleeve 60. As the blow cycle is complete and the blowpin assembly is moved upward, the moil M stays on the assembly to be stripped away, as shown in FIG. 10. FIG. 9 shows flange 48 created during molding. The moil M is removed as the blowpin assembly 52 is removed from the container. With a finished flange 48, a finger pump or trigger sprayer with a closure can be secured to the container. The compression of closure against the flange will create an hermetic seal between these layers at the mouth of the container. As a result, a gasket is not required between the closure and flange.

Referring to FIG. 12, this figure shows the difference between a collapsible inner layer or bag or multilayer container with a flange and no adhesive used. In FIG. 11, the flange 48 which was molded over the finish will prevent the air from flowing into the bag from the atmospheric vent. The compression of the closure without a gasket compresses together both the inner layer flange 48 and radial surface of the finish 36 on the outer layer 30. This prevents the vacuum from escaping. The prior art container shown in FIG. 13 will not retain vacuum because the outside air will flow up through the vent, between layers across the closure and through the pumping device.

In accordance with another aspect of the invention, the outer container is made of olefin plastic, preferably high density polyethylene (HDPE) and the inner container is made of amorphous nylon. Amorphous nylon as used herein means a polyamide that is not crystalline in the sense that it does not display any crystalline melting point as measured by differential scanning calorimetry. In the preferred embodiment, the amorphous nylon is made by condensation of hexamethylene diamine, isophthalic acid and terephthalic acid.

Thus, the inner layer of a multilayer container delaminates or separates from the outer layer easily without additional handling or using a secondary machine operation. The layer separation is accomplished by choosing resins which do not adhere to each other and satisfy customer criteria. In a functional multilayer container package, the neck is sealed with a finger pump or similar device which is used to create a vacuum that will draw the contents out while collapsing the inner layer. Outer layer deformation is not an acceptable effect. No adhesives are used between the different thermoplastic layers. Using an outer layer of high density polyethylene together with amorphous nylon will function correctly and meet the above criteria.

Processing with differently structured nylons such as an amorphous nylon results in the inner layer significantly separating with less force than is required with other resins such as a crystalline structured nylon.

In addition to the aforementioned advantages of utilizing amorphous nylon, the following advantages are achieved in the container made utilizing amorphous nylon:

1. Eliminate predelamination of the inner layer relative to outer layer of a bag in a bottle type multilayer container. The predelamination is defined as any method of pre-separating the inner from the outer layer prior to filling the container with a product.

2. Less force or vacuum is required to separate the inner layer from the outer layer. Typically, the container is filled with a product and evacuated without extra handling or predelaminating the inner layer so to help it function. A finger pump or trigger sprayer device is used to evacuate product and collapse the inner bag together.

3. Does not require special equipment or extra secondary processing which injects or traps air between layers.

4. Eliminates container outer wall deformation.

5. Eliminates using multiple atmospheric vent holes in the container outer layer.

Previous designs need to inject air or gas through holes made in the base and/or sidewalls of the outer layer of a multilayer container to help separate layers. Other designs have extensive processing steps or expensive equipment to separate the inner from the outer layer before it is filled with a product. The amorphous nylon does not require any predelamination to separate the nylon from a HDPE layer when the container is evacuated with product. Using a thin layer of amorphous nylon of approximately 0.002, to 0.006 in. thick as an inner layer and a outer layer of HDPE of 0.020 in. or greater thickness will separate as previously mentioned without extra handling. The thickness of the inner amorphous nylon layer is uniform throughout but can vary depending on the a oxygen barrier requirements and package functional requirements. Using a crystalline structured nylon requires a force or vacuum two times or greater to separate the inner layer from the outer layer. This causes container outer wall deformation and is very undesirable. When processing, a co-crystalline barrier may be developed between the HDPE and the crystalline nylon. Crystalline nylon which shows these characteristics are Allied-Signal's Capron Xtraform XPN1539F and also CA73YP. A satisfactory amorphous nylon, Selar PA 3426, made by DuPont results in good separation from the HDPE.

Amorphous nylon does not have a defined crystalline melting point, as contrasted with crystalline, and therefore softens as the melt temperature increases over a large range. Amorphous nylon is a polyamide made by condensation of hexamethylene diamine, isophthalic acid and terephthalic acid. Amorphous nylon has better oxygen, moisture and carbon dioxide barrier properties especially at high humidities when compared to crystalline nylon. Amorphous nylon has better transparency, higher gloss and lower haze than crystalline nylon. It has been found that an amorphous nylon inner layer tends to shrink away from the outer layer and eliminates any tendency for adhering to the outer layer, as contrasted to crystalline nylon. The properties of amorphous nylon and crystalline nylon can be compared by reference to the following:

Melting Point Differential Scanning Calorimeter (DSC) Amorphous Nylon (Selar Pa 3426): No melting point Crystalline Nylon (Capron): 201.94° C. High Density Polyethylene (Paxon): 132.03° C.

Oxygen Permeation Amorphous Nylon: 1.3 cc/mil/100 in.sq./24 hr./atm (95% RH) @ 77° F. Crystalline Nylon: 12 cc/mil/100 in.sq./24 hr./atm (95% RH) @ 77° F.

Carbon Dioxide Permeation Amorphous Nylon: 6 cc/mil/100 in.sq./24 hr./atm (95% RH) @ 77° F. Crystalline Nylon: 120 cc/mil/100 in.sq./24 hr./atm (95% RH) @ 77° F.

Moisture Vapor Transmission Rate Amorphous Nylon: 1.85 gm/100 in.sq./24 hr. @ 95% RH @ 73° F. Crystalline Nylon: 12.44 gm/100 in.sq./24 hr. @ 95% RH @ 73° F.

Optical Properties Transparency (1 mil blown film) Amorphous Nylon: 70% Total Crystalline Nylon: 10% Total Although the multilayer container has been described as comprising two layers, the container may have more layers as shown in the following examples:

EXAMPLE I

| outer layer | high density polyethylene |
| inner layer | amorphous nylon |

EXAMPLE II

| outer layer | high density polyethylene |
| inner layer | amorphous nylon |
| intermediate layer | composite of outer and inner layer regrind |

TESTING

Test I

A layer break away comparative test was made between containers having an outer layer of high density polyethylene and an inner layer of the crystalline or amorphous nylon. A vacuum gage was attached to each test sample. Vacuum was generated until a peak reading was achieved on the gage. After the peak reading was reached, a dropoff of vacuum was expected. The peak reading is the force it takes to separate the inner layer from the outer layer. The vacuum dropoff reading occurs when the layers separate. All test containers had atmospheric vents created in their bases. The test was aborted if the sidewall panels collapsed before the inner layer separated or vacuum dropoff was not achieved.

TABLE I

| Sample | Capron XPN1539F | Capron CA73YP | Setar PA 3426 |
| --- | --- | --- | --- |
| 1 | 200-SWD | 200-SWD | 100-60-NSWD |
| 2 | 200-SWD | 200-SWD | 90-60-NSWD |
| 3 | 200-SWD | 200-SWD | 100-80-NSWD |
| 4 | 200-SWD | 200-SWD | 100-70-NSWD |
| 5 | 180-SWD | 210-SWD | 50-50-NSWD |
| 6 | 160-SWD | 200-SWD | 90-50-NSWD |
| 7 | 160-SWD | 210-SWD | 120-50-NSWD |
| 8 | 180-SWD | 220-SWD | 120-70-NSWD |
| 9 | 190-SWD | 210-SWD | 110-70-NSWD |
| 10 | 150-SWD | 200-SWD | 110-70-NSWD |

All measurements are MM-HG
S.W.D. indicates sidewall deformation. Vacuum dropoff was not achieved.
N.S.W.D. indicates no sidewall deformation. Vacuum dropoff was achieved.
The third column indicates two numbers. The left number is the peak vacuum and the right number is when the collapsed inner layer lifts from the base of the container.

Test II

A visual observation test was performed. Two groups of test samples were collected. Test group one consisted of containers which have an amorphous nylon inner layer and high density polyethylene as the outer layer. Test group two was composed of crystalline nylon as the inner layer and the same high density polyethylene as the outer layer. No adhesives were used between layers. The container panels were removed from both groups of containers. The test consisted of separating the layers by hand to observe the ease of separation and to view any material which would adhere to one of the layers. Group one was found to have no peeling, material threading or adhering between layers. Actually, they slipped apart from each other very easily. Test group two was found to have fine material strands between the layers or layers which stick together, i.e., like glue.

In accordance with another aspect of the invention, the atmospheric vent is made during the blow molding of the parison without the need for further trimming.

In the present invention, the inner bag layer is not secured to the outer layer by adhesives, bonding, pinching or gathering at the base of the bottle, sidewalls or panels or at the neck of the container.

Current base tooling is modified to help start the creation of the atmospheric vent opening 42. The vent opening 42 is created across the central portion of the parting line at the base of the container. The tooling is designed so that the central portion of the parting line does not pinch the central portion of the tail as much as the remaining portions of the tail. The slot in the tooling for forming the vent opening is wider than the rest of the pinch line, for example, an additional 0.004 inch width (0.002 in. per side) is provided for approximately 70% of th parting line width. The wider gap on the tooling creates additional clearance so the material is thicker at that point. The remaining parting line pinches the parison tail to less than 0.005 in. A tail removing device is attached to the mold so that when the tails are removed at the end of the machine cycle, more material is removed at the slit. This forms a wider gap than the remaining parting line. None of the material from the inner layer 32 extends entirely through tie vent opening 42 to the generally planar outer surface of the base 38. As the container cools, the gap will widen slightly due to the thermal shrinkage of the resins and the difference of thickness of the HDPE and amorphous nylon.

It can be seen that the finished vent opening 42 does not have a molded rib projecting downward. In a wet area, i.e., bathroom, the problem with a rib projecting downward is that it could come in contact with water and draw the water up between the layers.

Figure 3:
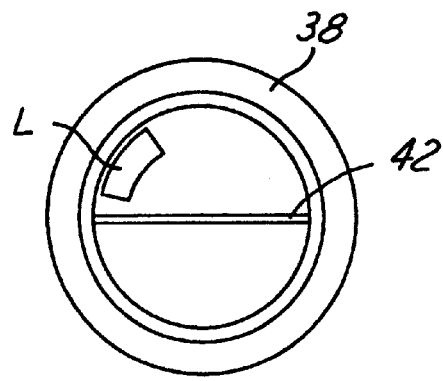
FIG. 3 is a bottom plan view.
Figure 4:
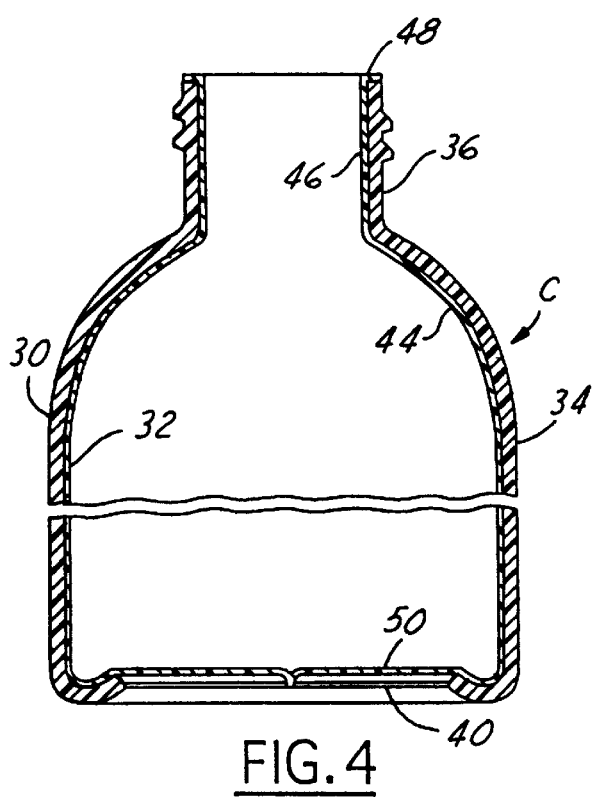
FIG. 4 is a sectional view taken along the line 4—4 in FIG. 2.

If one or more decorating lugs L are provided on the outer surface of the base of the outer container for rotating the container during handling and decorating, they are located in circumferentially spaced relation to the parting line and radially outwardly with respect to the vent opening 42 (FIG. 3).

Figure 14:
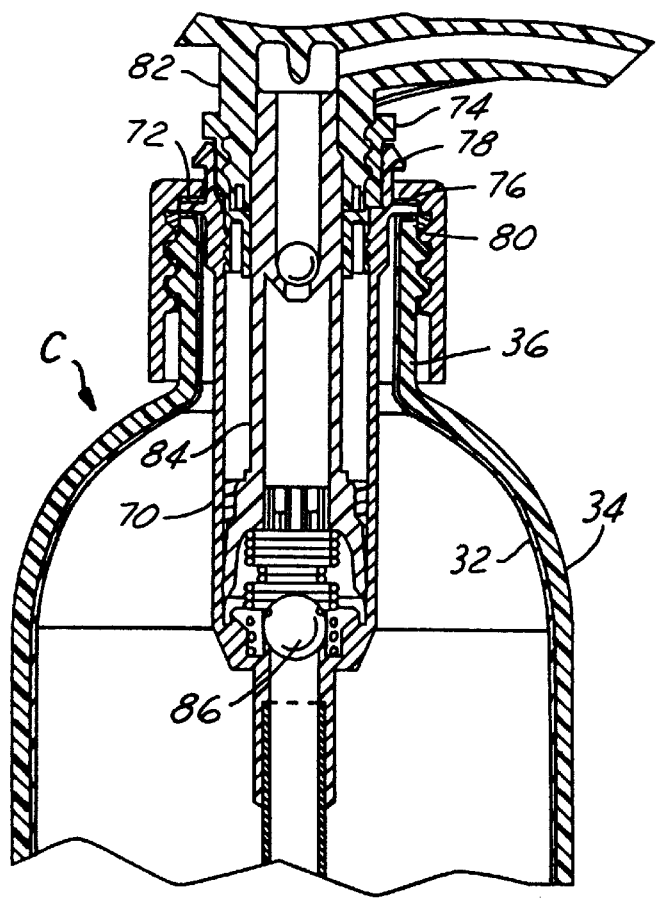
FIG. 14 is a fragmentary sectional view on an enlarged scale of the container embodying the invention with a closure and pump in position.
Figure 15:
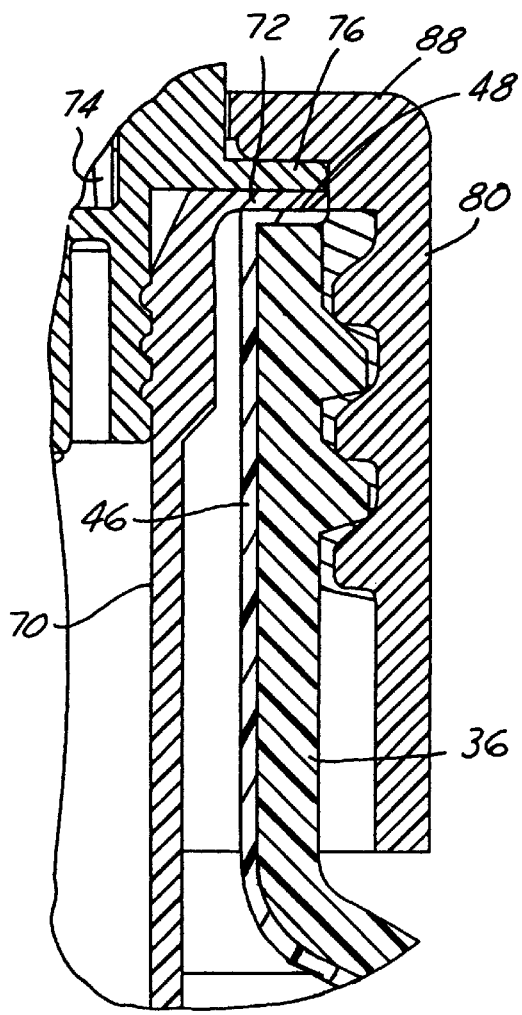
FIG. 15 is a fragmentary sectional view on a greatly enlarged scale of a portion of the assembly shown in FIG. 14.
Figure 17:
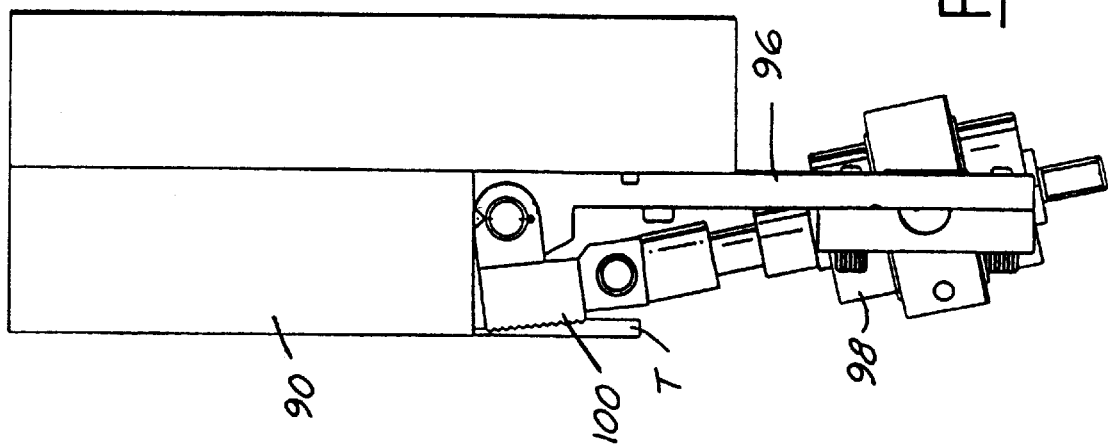
FIG. 17 is an end view taken from the right in FIG. 16.
Figure 16:
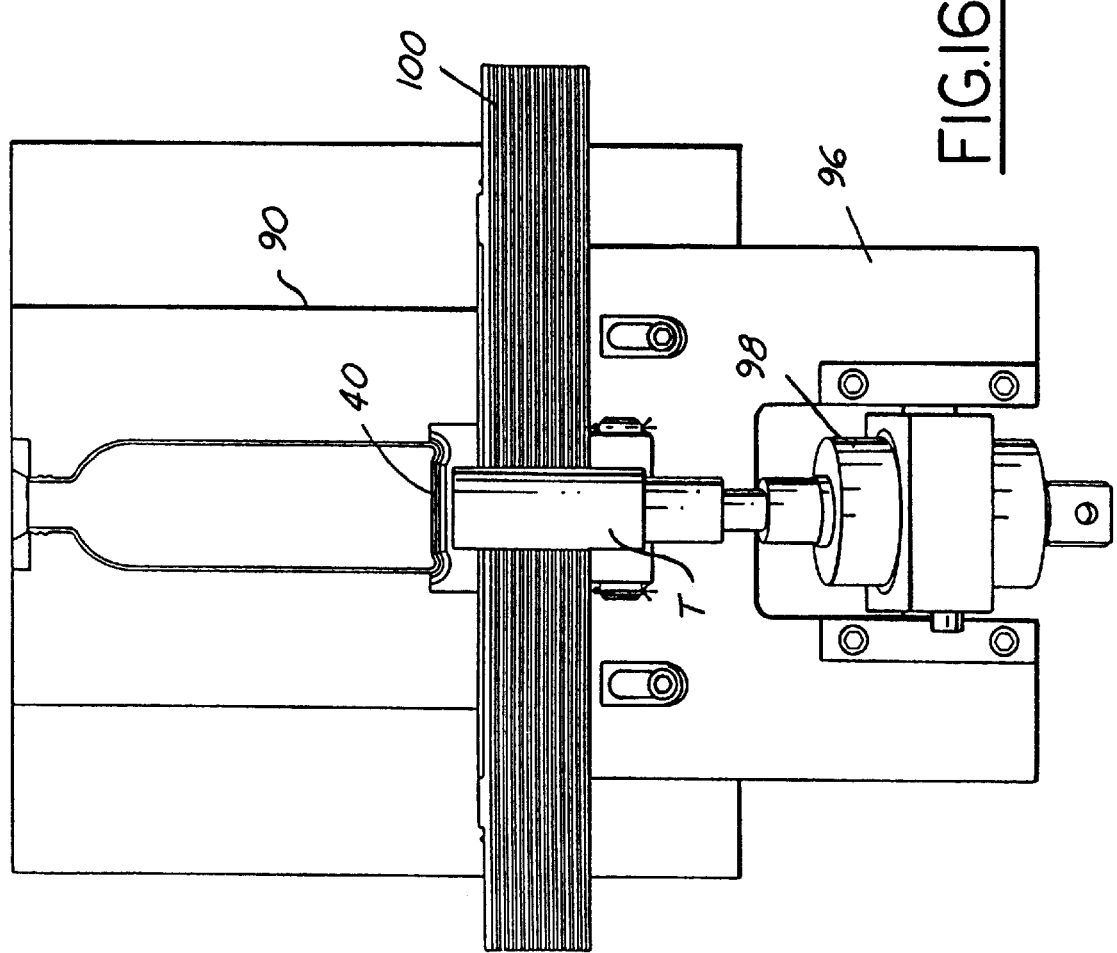
FIG. 16 is an elevational view of a tail puller associated with the blow mold.
Figure 18:
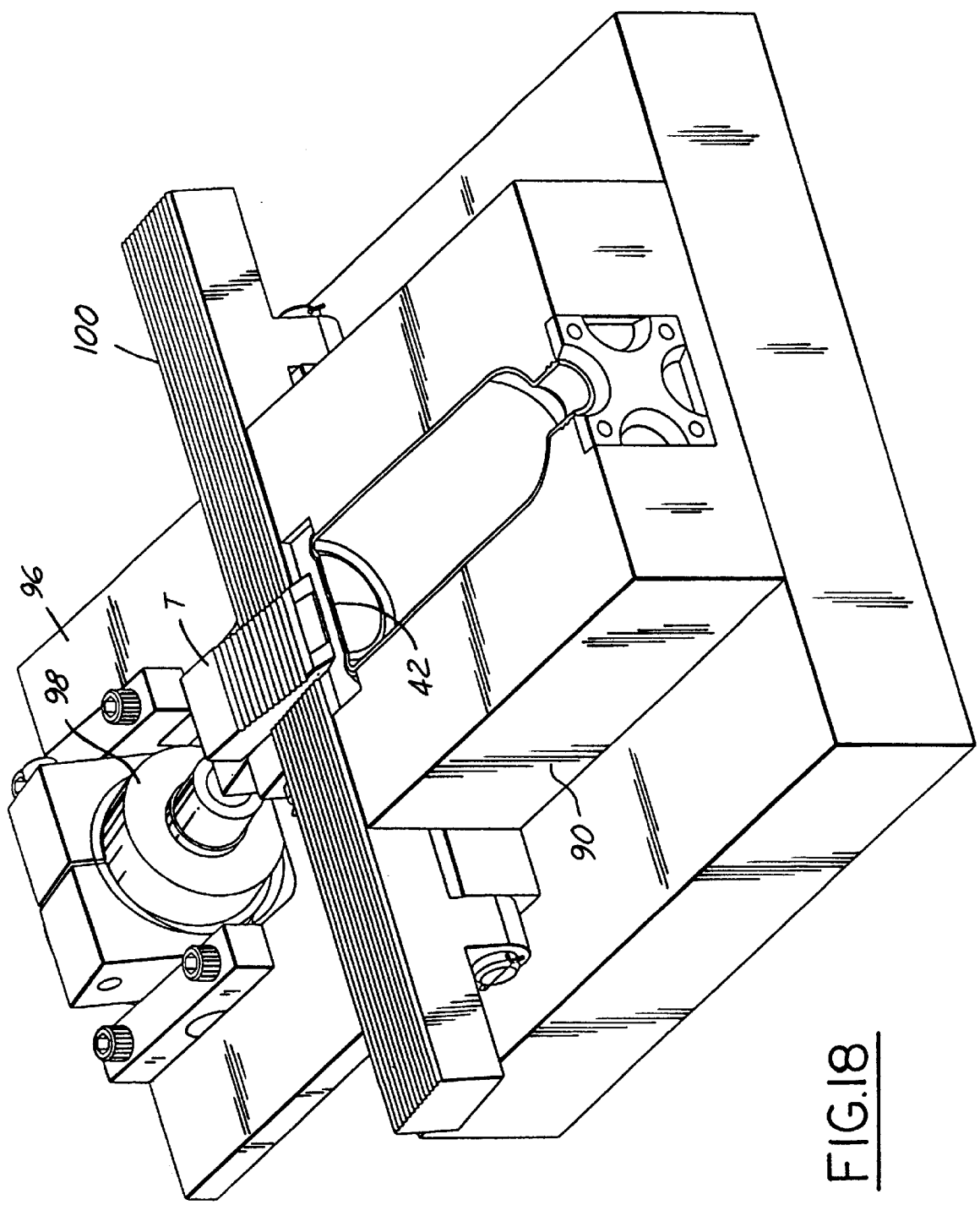
FIG. 18 is a perspective view of one of the molds showing the tail removed from the container.
Figure 19:
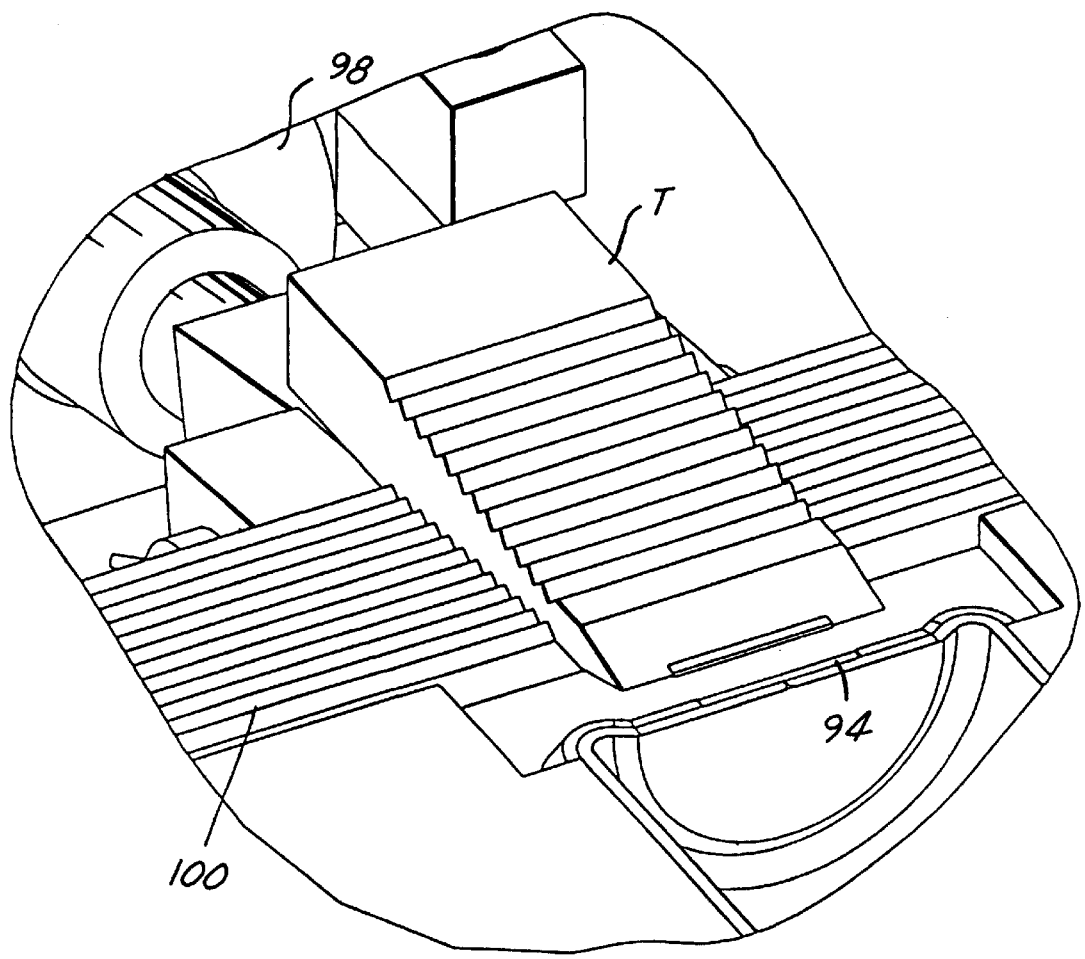
FIG. 19 is a fragmentary perspective view of a portion of FIG. 18.
Figure 20:
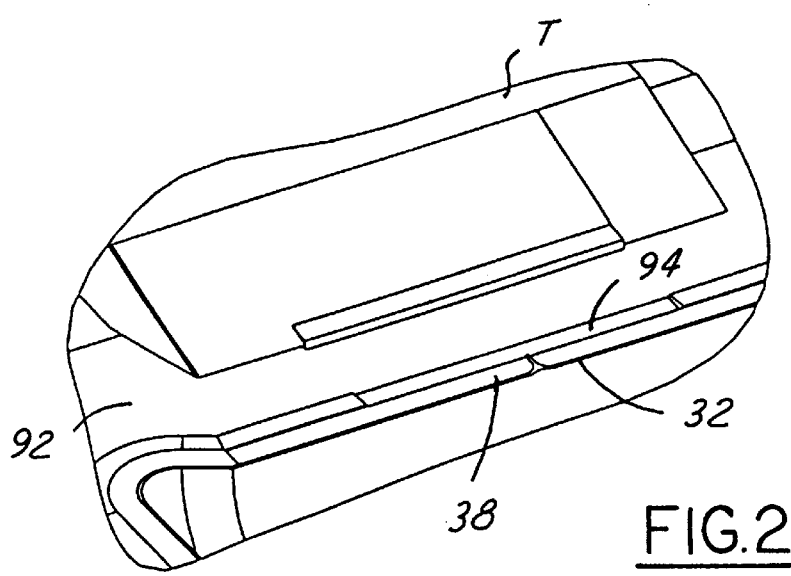
FIG. 20 is a fragmentary perspective view on an enlarged scale of a portion of FIG. 19.

FIGS. 14 and 15 show the container embodying the invention with a closure and a ventless pump in the shipping position. The pump includes a ventless tank 70 having an integral flange 72; a threaded cap 74 having a radial flange 76; and integral axial locating elements 78 extending through an opening in the flange 76 to retain a closure 80 in position. An actuator 82 is snapped into a piston 84 after threaded cap 74 is snapped into th tank 70 and a closure is snapped over the axial locating elements 78. This assembly actuates piston 84 and associated spring loaded ball 86 in accordance with conventional pump design after the actuator 82 is unthreaded out of shipping position. The flanges 72 and 76 are interposed between the base wall 88 of the closure and the flange on the inner layer overlying the finish of the outer layer thereby providing a construction that does not require any other gasket or sealing. It can be seen that a flange is interposed between the base of the closure and the flange on the inner layer. Upon actuation of the pump, the product is dispensed and the differential pressure causes the bottom of the inner layer to lift off the base of the outer layer.

Partly diagrammatic FIGS. 16–20 show the apparatus for forming the atmospheric vent opening in the outer layer of the container. Each mold half 90 wherein the container is blow molded has a bottom forming insert 92 with a radial recess 94 such that when the molds are brought together a slot is formed which pinches the central portion of a parison a lesser amount than the outer portions of the parison. A pair of tail puller assemblies 96 is provided to clamp the tail T defined by pinching the parison. Each tail assembly 96 includes serrated jaws 100 actuated by an air cylinder 98 when the molds close to grasp the tail. Toward the end of the molding cycle, while the molds are closed, cylinders 98 are actuated and serrated jaws 100 are pivoted and pulled downwardly to remove the tail T leaving a vent opening 42 in the outer layer of the container which has been blow molded.

It can thus be seen that there has been provided a multilayer container wherein any tendency of the inner layer to adhere to the outer layer is assured, wherein no delamination step is required in the manufacture; wherein the container does not require trimming and the like; and wherein the atmospheric vent opening is obtained during the blow molding of the package.

What is claimed is:

1. Apparatus for blow-molding a hollow plastic container having an atmospheric vent in the bottom of the container, said apparatus comprising:

a pair of mold halves that are closable to form a blow mold cavity, each of said mold halves including a bottom portion with a radial recess that cooperates with the recess of the bottom portion of the opposing mold half to form a slot for pinching a central portion of a parison between the mold halves but not severing the parison, a tail puller mechanism on each of said mold halves for grasping a tail portion of the parison that extends from said slot between said mold halves, and means for actuating said tail puller mechanisms when said mold halves are closed to grasp and pull the parison tail portion extending from said slot, and thereby sever the tail portion from the parison, to leave an atmospheric vent in the bottom of the container formed between the mold halves corresponding to the geometry of said slot.

2. The apparatus set forth in claim 1 further comprising a combined blow pin and cutter having a configuration for blowing a parison in said cavity, shaping a flange on the parison, and cutting a moil from the parison to provide a finished container.

* * * * *